United States Patent Office 3,433,873
Patented Mar. 18, 1969

3,433,873
COMPOSITIONS AND METHODS FOR CONTROLLING BIRDS
Andrew J. Reinert and Ralph P. Williams, Bartlesville, Okla., assignors to Phillips Petroleum Company, a corporation of Delaware
No Drawing. Filed Apr. 5, 1966, Ser. No. 540,178
U.S. Cl. 424—263                    8 Claims
Int. Cl. A01n 9/22

ABSTRACT OF THE DISCLOSURE

Live bird management is accomplished by placing in an area in which the birds are to be managed an amidopyridine, picoline, lutidine, trimethylethyl pyridine or a higher alkyl substituted pyridine. A generic formula is given.

---

This invention relates to the control or management of birds and other pests, for example, rodents such as rats. The invention also relates to the protection of areas, fields, crops, buildings or other places or things against intrusion, consumption, ravaging, or soiling by such pests.

A concept of the present invention is that a compound having the formula

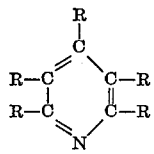

where each R is one of

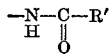

H, $CH_3$—, $C_2H_5$, n-$C_3H_7$, i-$C_3H_7$, and one and only one R is

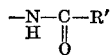

and R' is H or an alkyl radical containing 1 to 6 carbon atoms will effectively control pests such as birds, for example, as described herein.

Another concept of the invention is that such compounds used alone, in admixture, or one or more of them in admixture with other compounds which also can be management or control agents, in a composition containing a carrier which will carry the agent or agents into the system of the bird or pest can be applied to an area or to the pest to obtain effective control or management, the control or management being further described herein.

Some patents which are related to the general field to which the present invention applies are: 3,044,930, 3,113,072, 3,137,617, 3,150,041, 3,193,455. Other patents or applications may also relate to said field.

The control of birds is one of the major problems confronting farmers and city managers at this time. For instance, the loss of grain and seed by bird consumption represents considerable financial losses to farmers each year. Cities frequently spend many thousands of dollars a year in an attempt to drive away birds and thus prevent the defacing of buildings and the like. Furthermore, there have been several airplane crashes attributed to flocks of birds circling in the landing pattern and near the ends of airport or airfield runways.

Various means have been employed to scare or otherwise drive birds away from certain localities. For example, scarecrows have been used for many years by farmers in grain fields or other areas, although this method has actually met with little success. More modern versions of the scarecrow such as artificial owls and the like, have also met with little success. Certain types of noisemakers such as sirens and the like have likewise been used. Still more recently, chemical repellents have been developed which, to some extent, alleviate the problem.

For purposes of the present invention, a compound or agent is a control or management agent if it can be applied in some manner to reduce live bird or pest population in an area or place, etc. The action by which the compound or agent accomplishes this can be the same or different from pest to pest or agent to agent and the precise action is not here intended to be limiting. However, it can be said that the agents of the invention have been observed to produce flock alarming systems and thus to reduce live bird population at certain areas without, however, killing the birds at said areas. Such action is particularly effective at or near airports because the flocks go away or stay away rather than die there as would be the case with agent lethal to the pests in the small doses in which the agents of this invention can be safely applied without being lethal.

An object of the invention is to provide a method for control or management of birds or other pests.

Another object of the invention is to provide a composition suitable for use to control or manage pests, especially birds as in bird populations. Another object of the invention is to clear areas of bird population existing at said areas and to keep them away for extended periods of time. A still further object of the invention is to protect property against soiling by pests, such as birds. A further object of the invention is to protect materials normally consumed as food or other ingredients of a bird's diet.

Other concepts, objects and the several advantages of the present invention are apparent from a study of this disclosure and the appended claims.

According to the present invention, we have found that amidopyridines are agents to effectively control pests and are especially effective bird control chemicals which can be applied to feed grains or other materials eaten by pests or birds.

These chemicals have been field tested and were especially effective in controlling nuisance bird populations in the treated areas.

The compounds disclosed above are effective "bird management" agents. Birds that have eaten even a very small amount of these "bird management" agents are unable to fly for some time and during this period of time (inability to fly) the birds undergo convulsions, emit warning or distress cries to other birds, and the like. It is not known definitely by what mechanism these warning cries or convulsive actions serve to drive other birds away from affected birds but, as shown by the specific examples hereinbelow, the compounds of the invention are extremely effective for clearing birds from an area after at least one of the birds has been subjected to the action of one of the compounds of the invention.

Ingestion of a sufficient amount of at least one of the compounds of the invention defined above by one or more birds produces symptoms such as tremors, loss of flight, fluttering, paralysis, and warning and distress cries. The result is that other birds, upon seeing birds having convulsions or suffering from paralysis, and hearing the distress cries emitted by affected birds, even entire flocks of birds, will leave an area and stay away from the area for long periods of time.

The compositions of the invention are also useful as avicides. The amount of heterocyclic nitrogen-containing compound ingested by a bird required to cause death will vary depending upon the particular compound employed, the species of bird, as well as other factors. Ordinarily, bird food treated with at least one weight percent of one or more of the compounds of the invention produces a treated material or food, when ingested by a bird, effective as an avicide since the mortality rate at the higher concentrations is rather high.

When employing the bird management or anti-flying compounds of this invention to reduce the number of birds in an area, one or more of the birds in the area to be cleared must ingest an effective amount of at least one of the compounds in order to achieve the best results. The active antiflying compounds can be ingested by the birds by feeding the birds treated food or by injecting a small amount of at least one of the compounds into at least one of the birds' bodies by suitable means. The amount of effective compound ingested by a bird to get the desired effect is generally within the range of 3 to 500 mg. of the active ingredient per kg. of bird weight, usually in the range of 5 to 100 mg./kg. The compounds of the invention can be conveniently given to birds by treating material which is normally eaten by the birds and thereafter placing the treated food or bait in the area from which it is desired to clear the birds. For example, grains and seeds such as sorghum, corn kernels, chopped corn, chicken feed, kaffir corn, wheat, oats, barley and the like, can be employed as well as such materials as potatoes, bread, peanut butter and the like. Sand, gritz, crushed oyster shells and the like can also be used. If a grain is used, a convenient method for treating the grain comprises impregnating the grain with a solution of one of the agents and a volatile solvent and thereafter evaporating off the volatile solvent. Acetone-water is a convenient solvent mixture for use in such a method of operation. If, however, bread is used, inverted emulsions in mayonnaise or other oily material are suitable for applying the antifying compounds to the bread.

The compounds of the present invention can be applied to bird food, such as grain, for their intended purose as a concentrate, or in combination with a carrier or other inert materials. Solvent or adjuvant carriers empployed should be substantially inert with respect to the active compound. Some examples of specific carrier materials that can be employed are water-acetone, deodorized kerosene, naphthas, isoparaffinic hydrocarbon fractions boiling in the range of about 260 to about 800° F. (Soltrol) and the like. If desired, the bird management compounds of this invention can be applied as aqueous emulsions by employing a suitable emulsifying agent. It is also within the scope of this invention to employ mixtures of the heterocyclic nitrogen-containing compounds and to employ mixtures of one or more of these compounds with other known bird control agents.

The agents can also be applied to the food or carrier in dried form by tumbling. Amine salts which are water soluble and simply prepared by dissolving the chemical in an aqueous solution of acids such as HCl, acetic, propionic, succinic, tartaric acids can be used. Tartaric acid in aqueous solution since it is essentially odorless and does not affect the desired properties of the disclosed compounds can be used. Aerosol formulations, which can be formulated by conventional recipes using dissolved or emulsified chemicals, can also be employed.

What ever method is employed for treating the bird food, the treated food will generally contain from 0.01 to about 10 percent by weight of the bird management compound, preferably 0.02 to 2 weight percent. The lower percentages will, of course, be used when the more active agents are to be employed, while the higher percentages will be used with the less effective agents. Larger or smaller amounts, however, can be employed, when desired, although larger amounts are generally uneconomical.

In actual operation, birds can be effectively cleared from an area, building, or other locality, with a very minor amount of one of the above-described compounds. It can be seen that by employing small amounts of treated grain, for example, one need not treat the entire area such as would be required if a true repellent material was employed. By operating in this manner, buildings, airport runways, grain fields, and the like, can be cleared of birds and maintained clear of birds for prolonged periods of time. This is particularly advantageous in grain fields since the farmers can place small amounts of treated grain in the fields shortly before the grain ripens, thus clearing the birds from the fields, before they have a chance to eat the crop. After the crop has been harvested, the use of treated bait or bird food can be discontinued. In many instances, it is desirable to first lure the birds into an area with a bait or untreated grain, and then place treated bird food in the area for the birds to consume with the result that affected birds warn and scare other birds away from that particular area.

The following specific examples are intended to illustrate the advantages of the bird management compounds of this invention, but it is not intended to limit the invention to the embodiments shown herein. As discussed above, it has only been specified how much of the active compound to deposite on treated bait. Various agents are required in different dosages to obtain the desired symptoms. The amount of active ingredient ingested by a bird needed to obtain the desired results will vary depending upon the compound employed and the species of birds treated. Since one wishing to clear an area of birds by the method of this invention has no control over the amount of treated food that a bird will eat, it is impossible to specify exactly what dose will be applied to birds under actual conditions. However, one method which can be used for selecting between species of birds is the use of different sized grain. For example, sparrows cannot eat whole kernal corn whereas pigeons can eat such food very readily. Thus, if one wishes to clear pigeons from a building or other area where only small populations of sparrows exist, whole corn can be used exclusively.

Specific compounds included within the scope of the present invention are:

4-acetamidopyridine
3-acetamidopyridine
2-acetamidopyridine
4-formamidopyridine
3-formamidopyridine
2-formamidopyridine
4-propionamidopyridine
3-propionamidopyridine
2-propionamidopyridine
3-acetamido-α-picoline
4-acetamido-β-picoline
2-acetamido-α-picoline
4-butylamidopyridine
3-acetamido lutidine
4-hexylamidopyridine, and structurally similar amido pyridines, picolines, and lutidines, trimethylmethylethyl pyridines, and higher alkyl substituted pyridines.

The compounds used as the management or control agents of the present invention are effective and less likely to kill affected birds and exhibit specifically greater than agents heretofore available. They are less toxic to mammals than compounds now in use.

Preparation of 4-acetamidopyridine 15.0 g. (0.17 mol) 4-aminopyridine was charged to a flask together with 50 ml. (0.53 mol) acetic anhydride and refluxed for 1¾ hours. The reaction mixture was poured over ice and made alkaline with 40 percent sodium hydroxide solution. The acetamide precipitated and was filtered. It was recrystallized once from water and again from 500 ml. benzene containing about 10 ml. ethanol. A 16.1 g. (74 percent yield) of 4-acetamidopyridine was recovered.

M.P. 151.5–152.5° C. (literature Chem. Ab. 50 1818: 148° C.).

*Analysis.*—C, 61.7 percent, found 61.8 percent; H, 5.9 percent, found 6.0 percent; N, 20.6 percent, found 19.4 percent.

The same procedure was used to prepare 3-acetamidopyridine but the starting compound was 3-aminopyridine. The crude product was contaminated with sodium acetate and water. This was removed by digesting the collected solid with boiling chloroform and by the addition of anhydrous magnesium sulfate and filtering. After stripping the chloroform from the filtrate, the product was recrystallized from benzene and ethanol as before. 17.1 g. 3-acetamidopyridine was produced.

M.P. 134.5–136° C. (Chem. Ab. 51, 1162: 132–136° C.). Yield 78.5.

*Analysis.*—C, 61.7 percent, found 61.8 percent; H, 5.9 percent, found 6.0 percent; N, 20.6 percent, found 19.4 percent.

Preparation of 4-formamidopyridine 15.0 g. (0.16 mol) 4-aminopyridine was suspended in a flask containing 10 ml. absolute ethanol and warmed to 50° C. Then 32 ml. (0.4 mol) ethylformate was introduced through the condenser and the mixture refluxed for 80 minutes. Since some solid was still visible at the end of the period an additional 10 ml. of absolute ethanol was added and refluxing continued for an additional 2 hours and 40 minutes (4 hours total). After the solvent had been stripped under vacuum, it was found that the reaction was still incomplete. Accordingly, a formylating mixture was prepared from formic acid and acetic anhydride. The solid recovered earlier, containing the still unconverted 4-aminopyridine was dissolved in 300 ml. tetrahydrofuran and 80 ml. of the cold formylating mixture added, with cooling, in small increments. Then the mixture was allowed to stand for 2 days when an additional 50 ml. of formylating mixture was added. The reaction mixture was allowed to stand another 15 hours. It was then concentrated to a syrupy residue which was extracted twice with boiling ether which converted the syrup to a white solid. The solid was dissolved in boiling acetone and fine white crystals were obtained on cooling. A second crop of crystals was obtained from the mother liquor after concentrating it.

M.P. 162.5–164° C. (J. Org. Chem., 24, 1010: 162–163° C.). Yield 15.9 g. (81.5 percent).

Preparation of 3-formamidopyridine 30.0 g. (0.32 mol) 3-aminopyridine and 71 g. (0.96 mol) ethylformate were refluxed for 22 hours. After concentrating, a syrupy liquid remained which slowly solidified on standing. This was dissolved in 125 ml. boiling ethanol and treated twice with Norite A and Fisher decolorizing charcoal; concentrated to a light amber syrup, it was dissolved in 450 ml. boiling benzene and allowed to stand for 2 days. A crop of white crystals thus obtained was recrystallized from boiling benzene and the resulting crystals vacuum dried at 40–50° C. M.P. 93–94° C.

*Analysis.*—C, 59%, found 59.3%; H, 4.9%, found 5.0%; N, 23.0%, found 21.8%.

Yield 18.2 g. (48%).

These preparations are illustrative of the general method used for amidopyridines.

The compounds were screened for effectiveness and to establish $LD_{50}$'s. "$LD_{50}$ is the dose required in milligrams of chemical per kg. of bird weight to kill 50 percent of the birds."

Although $LD_{50}$ is not a measure of the value of a chemical as a bird control agent, all of the bird management or control agents which we have found have high toxicity to birds in the sense that when a chemical of the invention is applied it is noted to produce convulsions, cause distress cries, prevents flying, etc. and the $LD_{50}$ provides a good measure of effectiveness when comparing the agent to another compound also producing these effects or other effects produced by the compounds of the invention.

It was found that these compounds were selective in their action and that mammals were not adversely affected by ingestion of these substances as noted herein.

The following table summarizes laboratory data on these compounds. The values given in mg./kg. are approximate $LD_{50}$'s. These are indicative of the relative effectiveness of the compounds in producing flock dispersing reactions. All are effective generally, with some more specific in this action on certain species. The relatively large $LD_{50}$ for chicks makes them attractive for control agents in areas inhabited by domestic fowl.

| Chemical | Chicks | Sparrows | Pigeons | Starlings | Redwings | Rats |
|---|---|---|---|---|---|---|
| 4-formamidopyridine | 25–50 | 3–5 | 7–10 | 5–10 | 5–10 | 85–100 |
| 4-acetamidopyridine | ≅60 | ≅15 | ≅15 | ≅5 | 10–15 | 400–500 |
| 4-propionamidopyridine | 25–50 | | ≅15 | ≅12 | ≅5 | ≅250 |
| 3-acetamidopyridine | 1,000 | 50 | 50 | | 25–50 | |
| 2-acetamidopyridine | 300–500 | 50 | 50 | | 50 | |
| 3-formamidopyridine | 500–1,000 | | 50 | | 50 | |
| 4-aminopyridine* | 10–15 | ≅3.6 | ≅6 | ≅5 | ≅9 | ≅21 |
| 4-nitropyridine-N-oxide* | 20–25 | ≅8 | ≅20 | 13–15 | 5–10 | ≅107 |

*Included for comparison only.

Generally the dose required for creating distress symptoms or alarm reactions varies from ½ to ⅓ of the $LD_{50}$ value.

Field tests (1) 4-acetamidopyridine was applied as the soluble tartrate to a grain bait and distributed in the area surrounding a feed mill. The original population of 300–500 sparrows infesting the area was reduced to 30–40 within five days. Cats and dogs which caught and ate a number of the affected birds suffered no ill effects.

(2) A similarly prepared grain bait was distributed in the area of a cattle sales ground which had a sparrow population of about 1000. This was reduced to virtually zero after five days of treatment. Pets capturing and eating affected birds suffered no ill effects.

(3) A feed was prepared containing 0.5 weight percent of 4-acetamidopyridine on corn chops. This was admixed to untreated corn chops to a 1:10 ratio, treated to untreated. The feed was distributed to specific business locations in a downtown area with a nuisance pigeon population exceeding 300. Within a two week period the pigeon population on the treated buildings was reduced to less than seven.

(4) A frame house was infested with a flock of 12 pigeons that were creating considerable nuisance and a potential health hazard. Two pans containing corn chips prebait were placed on the roof. After 6 days the pigeons were accepting the prebait. The prebait was then replaced with 2 pounds of a mixture consisting of one part of 0.5 percent 4-acetamidopyridine treated corn chops and 9 parts of untreated corn chops. After 3 days, although the bait was nearly gone the pigeons remained without apparent ill effect. Two pounds of a stronger mixture consisting of one part 0.5 percent 4-acetamidopyridine treated corn chops and 4 parts of untreated corn chops were then placed in the bait pans. By the next day only one pigeon remained on the house. This bird was tending two squabs which may explain its reluctance to leave. This pigeon was still frequenting the house eight days later, but no others had returned. The site was free of pigeons 21 days after this series of test was begun and the test was successfully completed. No affected pigeons were observed and no dead pigeons were recovered at the site. Control was effected quite rapidly with no adverse public reaction.

4-acetamidopyridine offers the advantage of low toxicity to mammals, a twofold difference between the lowest effective and lowest lethal dose, as a low mortality rate to pigeons and apparently has no repellent taste to birds.

4-propionamidopyridine is especially useful against redwings. It is specific for this species, produces excellent flock alarming symptoms, and has relatively low mamalian toxicity. These properties are highly and especially desirable in solution of feedlot and grain field problems.

We claim:

1. A method of managing live birds in an area which comprises subjecting the system of at least one of them to an effective amount of at least one controlling agent having the formula

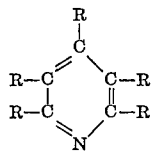

where each R is one of

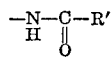

H, $CH_3$—, $C_2H_5$, n-$C_3H_7$ or i-$C_3H_7$, and one and only one R is

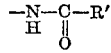

and R' is H or an alkyl radical containing 1 to 6 carbon atoms.

2. A composition suitable for management of birds which comprises a bait carrier which will carry at least one control agent into the system of said pests, at least one said agent being a compound having the formula of claim 1 and being present in said composition in an amount effective upon application of the composition to secure the desired control or management.

3. A method for reducing the number of live birds in an area which comprises subjecting the system of at least one of the birds at said area to at least one agent selected from the compounds having the formula of claim 1.

4. A method for protecting growing crops, plants or other materials normally consumed by birds which comprises treating said crops, plants, or other materials with a compound having the formula of claim 1.

5. A method for reducing the number of live birds in an area which comprises placing in said area a material which the bird will ingest, said material containing at least one pest control agent having the formula of claim 1.

6. A method according to claim 1 wherein the agent is at least one of 4-formamidopyridine, 4-acetamidopyridine, 4-propionamidopyridine, 3-acetamidopyridine, 2-acetamidopyridine or 3-formamidopyridine.

7. A composition according to claim 2 wherein the control agent is at least one of the compounds 4-formamidopyridine, 4-acetamidopyridine, 4-propionamidopyridine, 3-acetamidopyridine, 2-acetamidopyridine or 3-formamidopyridine.

8. A bird management composition comprising a bird food or bait carrier normally ingested by birds containing an amount effective upon use of said composition to desirably manage or control said bird and at least one bird management agent selected from compounds having the formula of claim 1.

References Cited

Chem. Abst. (1), 52 4641a (1958).
Chem. Abst. (2), 54 22631c (1960).
Chem. Abst. (3), 57 2095 July-December 1962.

ALBERT T. MEYERS, *Primary Examiner.*

S. FRIEDMAN, *Assistant Examiner.*